No. 615,423. Patented Dec. 6, 1898.
P. C. BRENNAN.
ASPHALT SCALE.
(Application filed Jan. 8, 1898.)

(No Model.)

Witnesses
J. G. Hinkel
Harry E. Hay

Inventor
Paul Carrington Brennan
by Foster & Freeman
Attorneys

UNITED STATES PATENT OFFICE.

PAUL CARRINGTON BRENNAN, OF NEW YORK, N. Y.

ASPHALT-SCALE.

SPECIFICATION forming part of Letters Patent No. 615,423, dated December 6, 1898.

Application filed January 8, 1898. Serial No. 666,051. (No model.)

*To all whom it may concern:*

Be it known that I, PAUL CARRINGTON BRENNAN, a citizen of the United States, residing at New York, (Long Island City,) in the county of Queens and State of New York, have invented certain new and useful Improvements in Asphalt-Scales, of which the following is a specification.

My invention relates to scales for weighing materials, such as asphalt mixtures, which are of such a character as to sometimes adhere to the weighing bucket or receptacle, thereby reducing the amounts delivered; and my invention consists of means whereby the failure to discharge the full amount after weighing is at once indicated, as fully set forth hereinafter and as illustrated in the accompanying drawings, in which—

Figure 1:
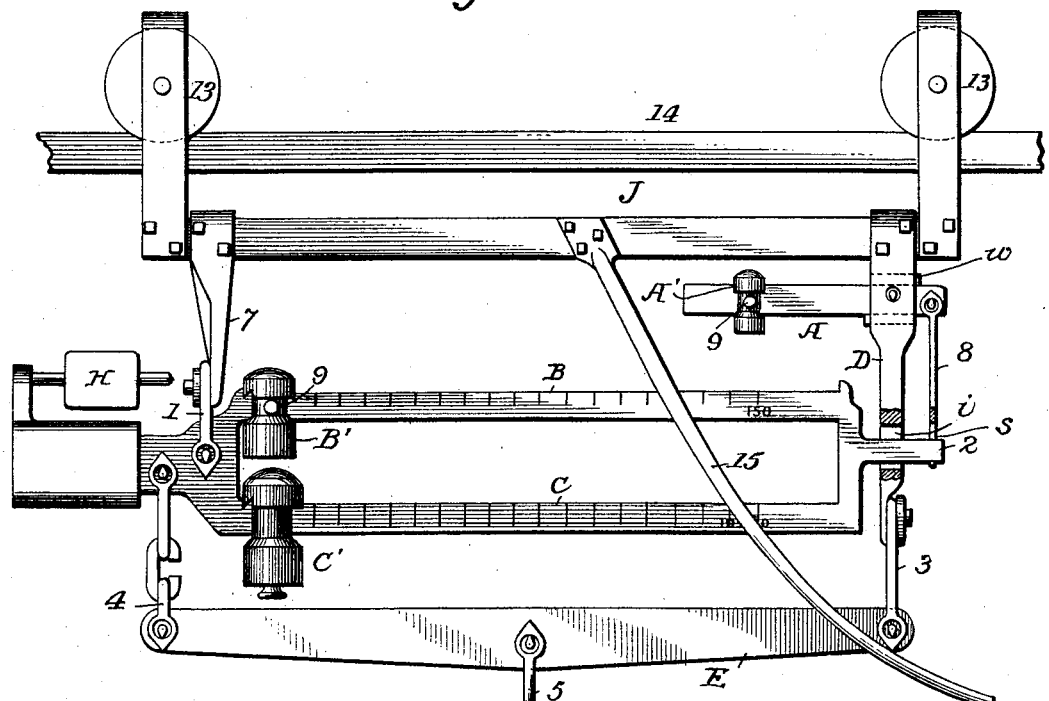
Figure 2:
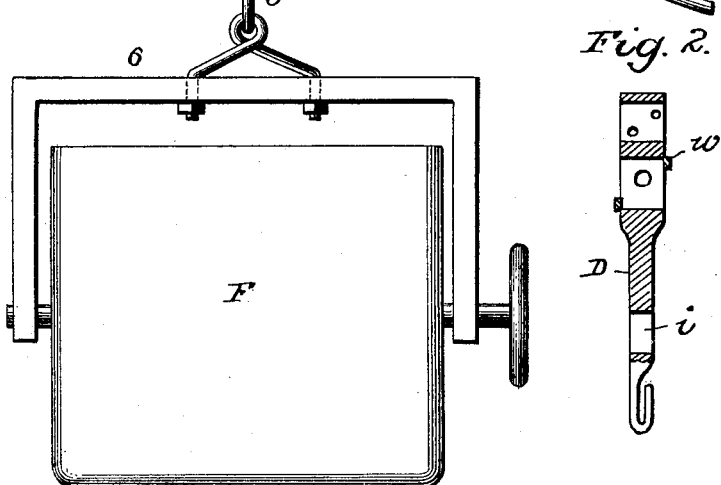

Figure 1 illustrates a compound scale with one arrangement of devices which may be used in carrying out my improvement, and Fig. 2 is a sectional view of one of the hangers.

The scale-beam may be of any suitable character, with a weighing-poise suitably adjustable thereon.

As shown, the scale is a compound scale with two graduated beams B C and is supported by knife-edge bearings in the clevis 1, suspended from a hanger 7 and counterbalanced by the adjustable counterweight H. The end or arm 2 of the beam projects through a slot $i$ in a stationary hanger D and is midway between the top and bottom thereof when the beam is balanced. A clevis 3, hanging from the hanger D, has openings for the knife-edge bearings at one end of a lever E, knife-edge bearings at the opposite end of which are supported in a duplex clevis 4, suspended from knife-edge bearings on the short arm of the scale-beam.

From the center of the lever E is swung a clevis 5 to which to hook the bucket-hanger 6, supporting the trunnions of a reversible bucket F.

A lever A is fulcrumed in the hanger D, and a long clevis 8, suspended from the short arm of said lever, has a slot $s$ to receive the end of the arm 2 of the scale-beam.

Upon the lever A slides a poise A'. A poise B' slides on the beam B, and a weighing-poise C' on the beam C, and each poise is provided with a set-screw 9.

A stop $w$, which is a cross-bar at the edge of the hanger D, prevents the descent of the long arm of the lever A after it is balanced horizontally. When the poises B' C' are at the inner end of the graduated beam, the weight H is adjusted to balance the beam, when the arm 2 of the beam will be midway in the slot $i$ and at the bottom of the slot $s$.

After the empty bucket is hung on the lever E the poise B' is moved out until the beam is balanced, when the poise is secured in place. The poise C' is then set to the point on the graduated beam indicating the amount of asphalt to be weighed (say one hundred and ninety-five pounds) and is then secured. This carries down the long end of the beam and brings the arm 2 to the bottom of the slot $i$ and raises the long arm of the lever A. The poise A' is then set to the left until the weight of the long arm of the scale-beam is almost but not quite counterbalanced. When the bucket is filled, the parts first take the position shown in the drawings, and when the full weight is in the bucket the arm 2 is lifted in the clevis 8, thus showing the proper amount to be in the bucket. The bucket is then emptied. If no part remains in the bucket, then the beam B C takes its position with the arm 2 at the bottom of the slot $x$ and the beam A is lifted, lifting the poise A'; but if any amount—say six or eight pounds—remains in the bucket, then the poise A' will overbalance the beam B C and the lever A will take a horizontal position when the bucket is reversed, thus indicating that a portion has not been discharged. Therefore in such case the poise C' is moved farther outward until the weighted end of the beam A is lifted. This is done whenever after emptying the bucket the beam A comes to a horizontal position.

If the ordinary scale were used, consisting of the parts shown without the parts A A' 8, while the long arm of the beam would rise and indicate the presence of the proper amount in the bucket it would also descend as soon as any material was removed from the bucket, and the operator would never know whether or not the full amount was discharged.

I do not limit myself to the precise arrangement described, as any suitable counterbalance for partially counterbalancing the long arm of a scale-beam of any suitable character after the weighing-poise has been adjusted may be used.

While the parts above described may be supported in any suitable manner, the usual way is to form the parts 7 D as parts of a carriage J, having wheels 13 13 running on a rail 14, an arm 15 extending from the carriage and constituting a ready means of pushing the same along the rail.

I claim as my invention—

1. The combination with a scale-beam and its weighing-poise, C', of means for partially counterbalancing the said beam after the adjustment of the weighing-poise to indicate the desired weight, said means being adapted to permit the independent upward movement of the weighted end of the beam, substantially as described.

2. The combination with a scale-beam and its weighing-poise, of a counterbalancing-lever A, adjustable poise thereon, and connections between said lever and the scale-beam arranged to permit the latter to move upward independent of said connections, and stop $w$ limiting the upward movement of said connections, substantially as described.

3. The combination of the scale-beam, its weighing-poise, lever A, and its poise A' for counterbalancing the weighted end of the beam, stop $w$ for the lever A, and clevis hung from the lever A and having a slot to receive the weighted end of the beam, substantially as described.

4. The combination in a scale of the compound beam having the poises B', C', a lever A and poise A', connected to counterbalance the weighted end of the beam, and clevis 8 hanging from the lever A and having an elongated slot to receive the end of the beam, substantially as described.

In testimony whereof I have signed my name to this specification in the presence of two subscribing witnesses.

PAUL CARRINGTON BRENNAN.

Witnesses:
   JOHN P. WHITEHORN,
   S. G. BRIGEL.